W. H. SMITH.
MACHINES FOR THE MANUFACTURE OF ARTIFICIAL STONE.
No. 177,578. Patented May 16, 1876.
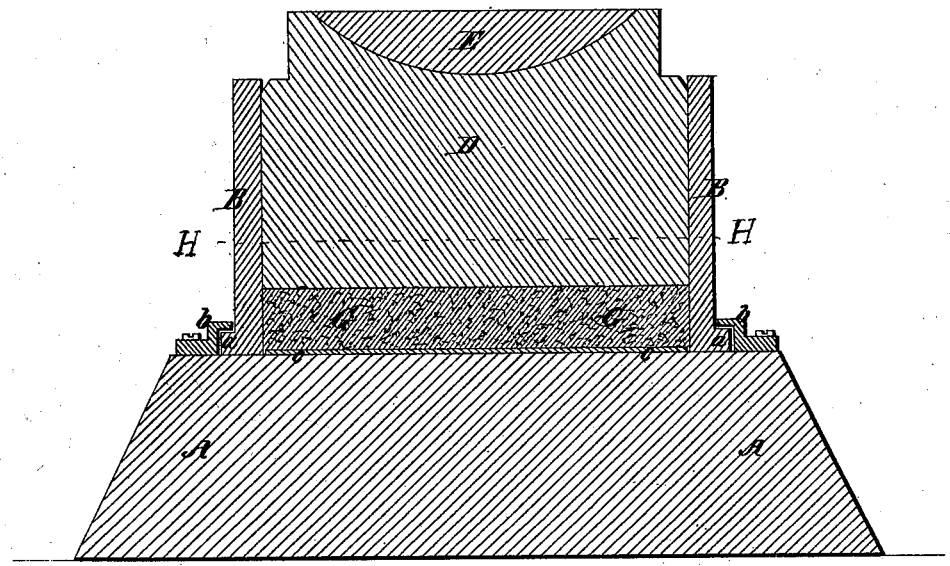
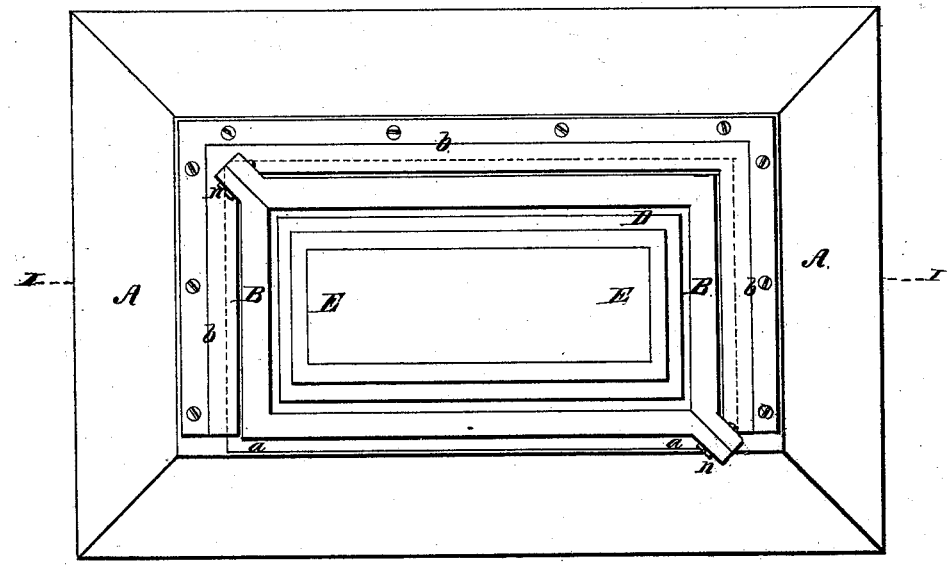
Witnesses. Inventor.

UNITED STATES PATENT OFFICE.

W. HARROLD SMITH, OF PHILADELPHIA, PENNSYLVANIA.

IMPROVEMENT IN MACHINES FOR THE MANUFACTURE OF ARTIFICIAL STONE.

Specification forming part of Letters Patent No. 177,578, dated May 16, 1876; application filed October 7, 1875.

*To all whom it may concern:*

Be it known that I, W. HARROLD SMITH, of the city of Philadelphia and State of Pennsylvania, have invented certain Improvements in the Method of Manufacturing Artificial Stone, of which the following is a specification:

My invention consists in the arrangement of devices for applying percussive force to the material of which the artificial stone is composed while the same is in a semi-plastic state, whereby the material is wrought into a condition more closely resembling natural stone than can possibly be effected by other known means.

To accomplish this result I employ the following mechanism, the description of which will be best understood by reference to the accompanying drawings, which show the principal portions of my apparatus in plan, Figure 1, and sectional elevation, Fig. 2.

A is a solid anvil of iron or steel, upon which a mold, B B, is slid and securely fastened by means of the flange $a\,a$ and clips $b\,b$, or any equivalent mechanical device. This mold is in two or more parts, and can be separated by unscrewing the nuts $n\,n$, by which its sections are held together. The under face of the flange $a\,a$ is armed with rubber or other packing, so as to secure an air-tight joint all round. C C is a thin metallic plate fitting accurately inside the mold, and held in position flush with the under face of flange $a\,a$ by springs, (not shown in the drawings,) which are withdrawn so as to release the plate by the mere act of securing the mold to the anvil.

The object of this arrangement is to allow the mold to be filled at a distance, the whole office of the plate being to prevent the material from escaping while the mold is being handled. It is not an essential feature of my invention, but may be dispensed with and the mold filled after it is in position on the anvil, or upon a table having its surface continuous therewith, so that the mold, after filling, may, without lifting, be slid directly under the hammer.

There are a series of minute holes pierced, at convenient places, in the sides of the mold or through the top of the die, to allow the escape of compressed air. (They are not shown in the drawings.) D is a die or plunger of metal, made to fit accurately into the mold B, and bearing upon its upper surface a mass, E, of slightly-elastic metal or wood, designed to take up a portion of the blow given to the die, so as to break the dead force of impact and prevent injury to the apparatus, such an expedient being absolutely necessary to this manufacture. This mass E may also consist of hard rubber, or it may be replaced by a system of springs or other equivalent mechanical device, or, finally, such expedients may be transferred to the anvil and act beneath the material, instead of being seated upon the die and acting above it. F (not shown in Fig. 1) represents the hammer of a steam-hammer, or any power-hammer of equivalent character.

The operation is as follows: The plate C C is fixed in position within the mold B B, which is then filled with the plastic material out of which the block is to be made to the level of the line H H, and the die D inserted thereon. The mold so filled is next slid upon the anvil A A, and fastened securely beneath the hammer F, which thereupon, by repeated blows, forges the block into the required consistency and thickness. The air compressed in the operation is allowed to escape through the minute holes pierced in the body of the mold, as already described. The forged block is readily released from the mold by unscrewing the nuts $n\,n$.

I do not claim the steam-hammer, nor the die and mold with its plate, nor the compressed-air-escape holes.

I claim as my invention—

The combination of a power-hammer, F, with an anvil, A, mold B, die D, and sub-elastic mass E, to effect the compacting and solidification of the semi-plastic material of which artificial stone is composed under powerful percussion, substantially as described.

W. HARROLD SMITH.

Witnesses:
JOSEPH LIPPMAN,
THEO. P. MATTHEWS.